United States Patent [19]

Maley et al.

[11] Patent Number: 5,463,996
[45] Date of Patent: Nov. 7, 1995

[54] HYDRAULICALLY-ACTUATED FLUID INJECTOR HAVING PRE-INJECTION PRESSURIZABLE FLUID STORAGE CHAMBER AND DIRECT-OPERATED CHECK

[75] Inventors: Dale C. Maley, Fairbury; Ronald D. Shinogle, Peoria, both of Ill.

[73] Assignee: Caterpillar Inc., Peoria, Ill.

[21] Appl. No.: 283,232

[22] Filed: Jul. 29, 1994

[51] Int. Cl.$^6$ .......................... F02M 37/04; F02M 47/02
[52] U.S. Cl. .................. 123/446; 123/506; 239/88
[58] Field of Search .................. 123/446, 467, 123/506, 447; 137/614.11, 614.13; 251/129.2, 129.21, 129.22; 239/88, 89, 93, 95, 96, 585.1, 585.2

[56] References Cited

U.S. PATENT DOCUMENTS

| | | | |
|---|---|---|---|
| 2,173,811 | 9/1939 | Bischoff | 123/139 |
| 2,347,363 | 4/1944 | Palumbo | 299/107.2 |
| 2,816,533 | 12/1957 | Reggio | 123/139 |
| 3,698,639 | 10/1972 | Sjotun | 239/124 |
| 4,211,202 | 7/1980 | Hafner | 123/457 |
| 4,260,107 | 4/1981 | Jackson | 239/74 |
| 4,392,612 | 7/1983 | Deckard et al. | 239/88 |
| 4,463,901 | 8/1984 | Perr et al. | 239/95 |
| 4,628,881 | 12/1986 | Beck et al. | 123/447 |
| 5,046,472 | 9/1991 | Linder | 239/585.2 |
| 5,082,180 | 1/1992 | Kubo et al. | 239/88 |
| 5,094,215 | 3/1992 | Gustafson | 123/500 |
| 5,121,730 | 6/1992 | Ausman et al. | 123/467 |
| 5,156,132 | 10/1992 | Iwanaga | 123/496 |
| 5,176,120 | 1/1993 | Takahashi | 123/447 |
| 5,235,954 | 8/1993 | Suerdlin | 123/447 |
| 5,271,371 | 12/1993 | Meints et al. | 123/446 |
| 5,297,523 | 3/1994 | Hafner et al. | 123/456 |

OTHER PUBLICATIONS

U.S. Application No. 08/282,136 filed Jul. 28, 1994 entitled "Plunger Retention".
U.S. Application No. 08/282,258 filed Jul. 29, 1994 entitled "Efficient Mixing Nozzle".
U.S. Application No. 08/242,501 filed May 13, 1994 entitled "Electronically-Controlled Fluid Injector System Having Pre-Injection Pressurizable Fluid Storage Chamber and Direct-Operated Check".
U.S. Application No. 08/172,881 filed Dec. 23, 1993 entitled "Fuel Injection Nozzle Having a Force Balanced Check".

Primary Examiner—Thomas N. Moulis
Attorney, Agent, or Firm—Anthony N. Woloch

[57] ABSTRACT

An improved hydraulically-actuated fluid injector system comprises a hydraulically-actuated fuel pressurization member, a fluid storage chamber, and a direct-operated check. Pressurization of fluid in the storage chamber begins before the start of fluid injection. Fluid injection begins by hydraulically unbalancing the check. Fluid injection ends by hydraulically balancing the check to allow a biasing device to close the check. Preferably, actuating fluid that is spilled from the fuel pressurization member (to end fuel injection) is communicated to a hydraulic motor which drives a source of pressurized hydraulically-actuating fluid.

The present invention provides improved control of several fluid injection parameters, including higher peak fluid injection capability and less fluid injection pressure drop at the end of injection, resulting in improved engine performance and lower emissions, noise, and wear. The present invention also improves efficiency of operation due to the above hydraulic energy recovery feature.

20 Claims, 3 Drawing Sheets

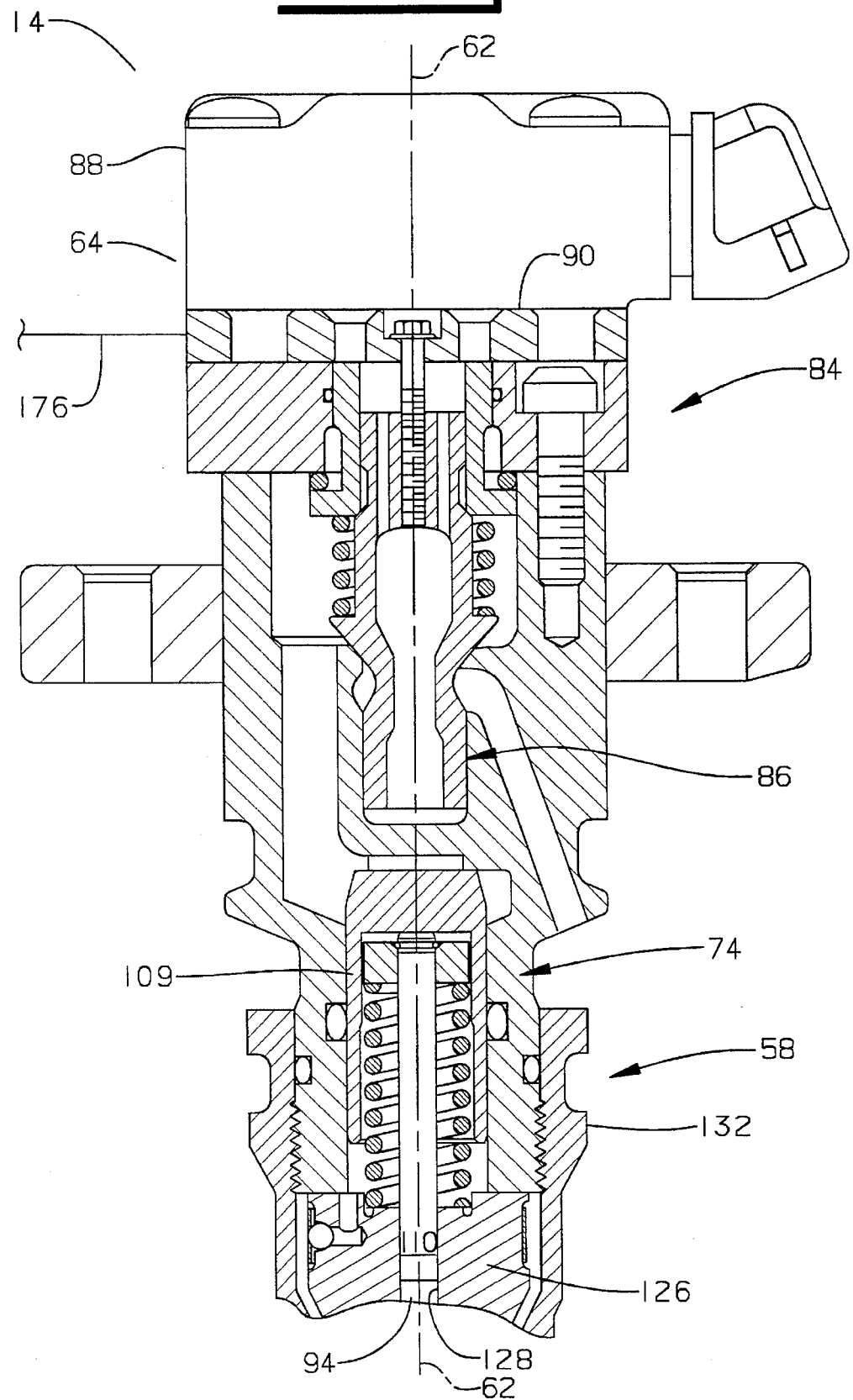
Fig_2_

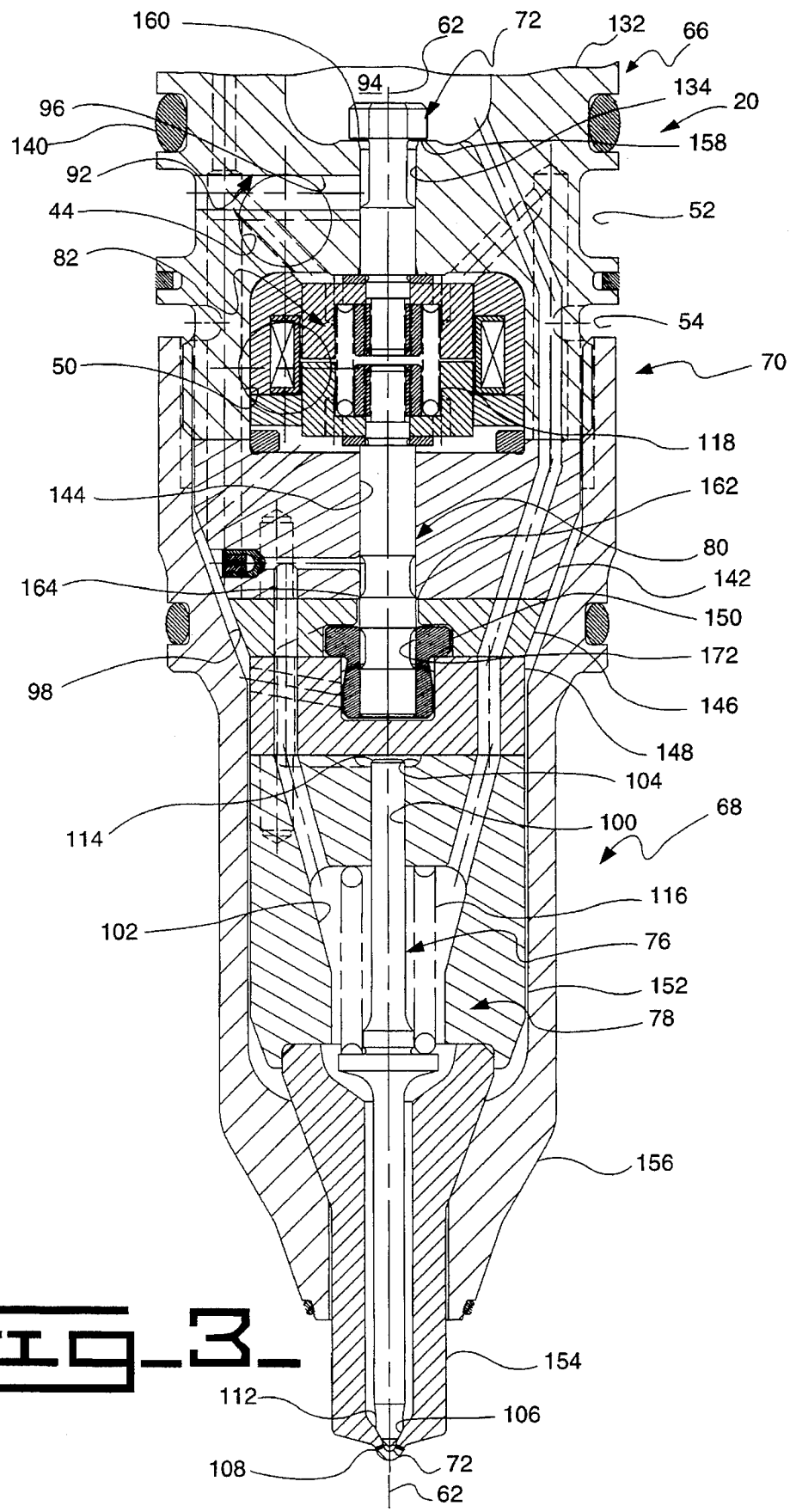
Fig_3_

HYDRAULICALLY-ACTUATED FLUID INJECTOR HAVING PRE-INJECTION PRESSURIZABLE FLUID STORAGE CHAMBER AND DIRECT-OPERATED CHECK

TECHNICAL FIELD

The present invention relates generally to fluid injection and, for example, more particularly to hydraulically-actuated fluid injectors and systems therefor.

BACKGROUND ART

Examples of conventional electronically-controlled fuel injection systems are shown in U.S. Pat. No. 4,392,612 issued to Deckard et al. on Jul. 12, 1983, U.S. Pat. No. 5,094,215 issued to Gustafson on Mar. 10, 1992, and U.S. Pat. No. 5,156,132 issued to Iwanga on Oct. 20, 1992.

In Deckard et al., the mechanically-actuated injector is constructed and operates in such a way so peak fuel injection pressure is drastically reduced as engine speed is reduced if fuel delivery (i.e., quantity during an injection cycle) is kept constant. The direct relationship between peak injection pressure and engine speed associated with this type of injector limits desirably higher fuel injection pressures to be attained at lower engine speeds and/or lighter loads. This consequently limits the engine's ability to achieve lower emissions, especially with respect to smoke or particulates.

In Gustafson, the injector has a conventional spring-loaded check which has a fixed valve closing pressure (VCP). A problem with a fixed VCP is the time delay associated with closing the check as the fuel injection pressure bleeds down to the VCP. The time delay and pressure drop can cause poor atomization of fuel injected into the engine combustion chamber late in the combustion cycle. A sharper end of injection would be desirable for reducing emissions, especially particulates or smoke. Moreover in Gustafson, the injector also has a variable-volume fuel pressurization chamber (36) whose volume is determined by a complex two-part plunger assembly (24) having a spring (38) as well as an external apparatus for varying the pressure of fuel supplied to the injector. Manufacturing variations in the spring rate as well as the variable pressure apparatus may cause imprecise control of the variable volume (36) resulting in imprecise control of the fuel injection quantity, peak fuel injection pressure and pressure decay or drop during an injection cycle.

In Iwanga, fuel injection pressure is used to assist closure of the movable check for ending fuel injection. One problem that may occur is unacceptably high impact loading of the check against the nozzle tip seat at high injection pressures thereby causing failure or breakage of the nozzle tip. Thus, peak fuel injection pressure capability of the injector is undesirably limited.

Known hydraulically-actuated fuel injector systems and/or components are shown, for example, in U.S. Pat. Nos. 5,121,730 issued to Ausman et al. on Jun. 16, 1992, 5,271,371 issued to Meints et al. on Dec. 21, 1993, and 5,297,523 issued to Hafner et al. on Mar. 29, 1994.

At the start of injection, typically, the selected peak injection pressure is not attained until the pressure increases over some period of time from a fixed relatively-low valve opening pressure. At the end of injection, the fuel injection pressure typically gradually diminishes over some period of time until a fixed valve closing pressure is reached.

The present invention is directed to overcoming one or more of the problems as set forth above.

DISCLOSURE OF THE INVENTION

In one aspect of the present invention, a hydraulically-actuated fluid injector system is disclosed comprising a fluid control passage, a fluid storage chamber, a first valve portion, a hydraulically-actuated fluid pressurization member, at least one fluid injection orifice, a direct-operated check, and a second valve portion which may be separate or integral with the first valve portion. The first valve portion selectively opens and closes fluid communication between the storage chamber and the control passage. When the first valve portion is opened, the pressurization member selectively displaces a variably selected volume of fluid from the storage chamber to the control passage. When the first valve portion is closed, the pressurization member selectively displaces another variably selected volume of fluid trapped in the storage chamber thereby pressurizing such fluid to a variably selected pressure. The check selectively closes and opens fluid communication between the storage chamber and the fluid injection orifice. Injection of pressurized fluid occurs through the fluid injection orifice when the second valve portion causes hydraulic unbalancing of the check to open the check. Injection of pressurized fluid ends when the second valve portion causes hydraulic balancing of the check allowing closure of the check.

In another aspect of the present invention, a hydraulically-actuated electronically-controlled unit fluid injector is disclosed in which the above elements are unitized in a single housing assembly.

The present invention provides improved control of several fluid injection parameters resulting in improved engine performance and lower emissions, noise, and wear.

BRIEF DESCRIPTION OF THE DRAWINGS

FIG. 2 is a diagrammatic enlarged partial view of a first or upper portion of one of the injectors shown in FIG. 1.

FIG. 3 is a diagrammatic further enlarged cross-sectional partial view of a second or lower portion of one of the injectors shown in FIG. 1.

BEST MODE FOR CARRYING OUT THE INVENTION

Figure 1:
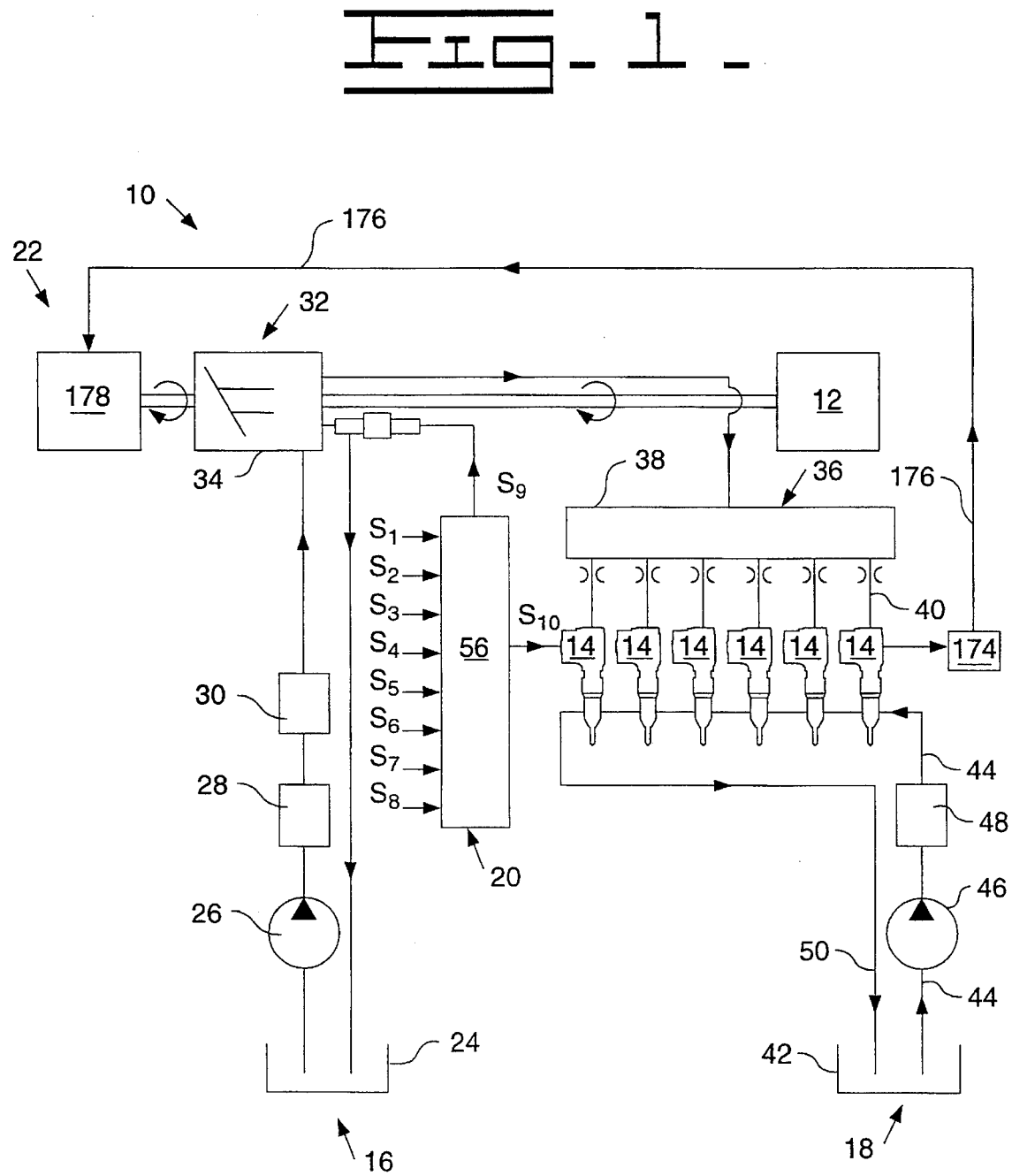
FIG. 1 is a diagrammatic general schematic view of a hydraulically-actuated electronically-controlled injector fuel system of the present invention, including an actuating fluid circuit and a fuel injection circuit, for an internal combustion engine having a plurality of injectors.

Referring to FIGS. 1–3, wherein similar reference numerals designate similar elements or features throughout the Figs., there is shown an embodiment of a hydraulically-actuated electronically-controlled injector fuel system 10 (hereinafter referred to as a HEUI-II fuel system).

The exemplary HEUI-II fuel system 10 is shown in FIG. 1 as adapted for a direct-injection diesel-cycle internal combustion engine 12. While the embodiment of FIG. 1 is shown applicable to an in-line six cylinder engine, it should be understood that the present invention is also applicable to other types of engines, such as vee-type engines and rotary engines, and that the engine 12 may contain fewer or more than six cylinders or combustion chambers. The engine 12 includes at least one cylinder head (not shown) having one or more injector bores (not shown).

The HEUI-II fuel system 10 includes one or more hydraulically-actuated electronically-controlled injectors 14, such as unit fluid injectors, each adapted to be positioned in a respective cylinder head bore. The system 10 further includes apparatus or means 16 for supplying hydraulically-actuating fluid to each injector 14, apparatus or means 18 for supplying a fluid such as fuel to each injector 14, apparatus or means 20 for electronically controlling the fuel injection quantity, injection timing, and/or actuating fluid pressure of the HEUI-II fuel system 10 independent of engine speed and load, and apparatus or means 22 for recirculating or recovering hydraulic energy of the hydraulically-actuating fluid supplied to the injectors 14.

The hydraulically-actuating fluid supplying means 16 preferably includes an actuating fluid sump 24, a relatively low pressure actuating fluid transfer pump 26, an actuating fluid cooler 28, one or more actuating fluid filters 30, a source or means 32 for generating relatively high pressure actuating fluid (such as, for example, a relatively high pressure actuating fluid pump 34), at least one relatively high pressure actuating fluid manifold 36.

Preferably, the fluid chosen for the actuating fluid is not fuel but is a relatively incompressible liquid having a relatively higher viscosity than fuel under the same conditions. Preferably, the actuating fluid is engine lubricating oil and the actuating fluid sump 24 is an engine lubrication oil sump. Alternatively, the actuating fluid may be fuel provided by the fuel tank 42 or another source.

Preferably, one actuating fluid manifold 36 is provided for and associated with each cylinder head having a bank of injectors 14. Each actuating fluid manifold 36 has one common rail passage 38 and a plurality of rail branch passages 40 extending from the common rail passage 38.

The common rail passage 38 is arranged in fluid communication with and downstream of the relatively high pressure actuating fluid pump 34. The number of rail branch passages 40 for each manifold 36 corresponds to the number of injectors 14 positioned in each cylinder head. Each rail branch passage 40 is arranged in fluid communication between the common rail passage 38 and an actuating fluid inlet of a respective injector 14.

The fuel supplying means 18 preferably includes a fuel tank 42, a fuel supply passage 44 arranged in fluid communication between the fuel tank 42 and a fuel inlet of each injector 14, a relatively low pressure fuel transfer pump 46, one or more fuel filters 48, and a fuel drain passage 50 arranged in fluid communication between the injector(s) 14 and the fuel tank 42. Preferably, each cylinder head defines an internal fuel supply passage 44 which communicates with an annular fuel inlet 52 of each injector 14 associated with the respective cylinder head.

Preferably, each cylinder head also defines a separate internal fuel drain passage 50 which communicates with a fuel outlet 54 of each injector 14 associated with the respective cylinder head. Alternatively, the fuel supply passage 44 and the fuel drain passage 50 defined in the cylinder head may be a single internal passage. Alternatively, the passages 44,50 may be a single or pair of external lines positioned outside of cylinder head. Optionally, a sleeve (not shown) may be sealedly positioned in the injector bore radially between the injector 14 and the cylinder head to separate internal coolant chambers of the cylinder head from the injector 14.

The electronic controlling means 20 or apparatus preferably includes an electronic control module 56 which controls 1) the fuel injection timing, 2) the total fuel injection quantity during an injection cycle, 3) the fuel injection pressure, 4) the number of separate injections or injection segments during an injection cycle, 5) the time interval(s) between the injection segment(s), 6) the fuel quantity of each injection segment during an injection cycle; and 7) any combination of the above parameter(s) between a plurality of injectors 14. Each of the above parameters are variably controllable independent of engine speed and load.

preferably, each injector 14 is a unit injector wherein both a fuel pressurization device 58 and a fuel injection device 60 are housed in the same unit. Although shown here as a unitized injector 14, alternatively, the injector could be of a modular construction with the fuel injection device 60 positioned separate from the fuel pressurization device 58. The injector 14 includes an imaginary longitudinal centerline axis 62 for reference purposes.

The injector 14 includes an electrical actuator and valve assembly 64 operable to selectively communicate pressurized actuating fluid to the injector 14 in response to receiving one or more variably-selected electronic control signals $S_{10}$ during an injection cycle. The injector further includes a housing portion 66, a nozzle portion 68, an electrical actuation means or device(s) 70, an electronically-controlled first pressure control valve 72, a reciprocal fuel intensification and pressurization member 74, a direct-operated check 76, a first biasing device 78, an electronically-controlled second pressure control valve 80, and a second biasing device 82.

The actuator and valve assembly 64 includes an actuator 84, preferably in the form of a solenoid assembly, and a valve 86, preferably in the form of a popper valve. The solenoid assembly 84 includes a fixed stator or coil assembly 28 and a movable armature 90. Preferably, the actuator and valve assembly 64, as well as the intensification and pressurization member 74, incorporate other features or improvements disclosed in U.S. Pat. No. 5,271,371 issued to Meints, et al. on Dec. 21, 1993.

The housing portion 66 defines a fuel control passage 92 and an integral fuel storage chamber 94. The internal fluid volume of the storage chamber 94 is preferably fixed and sized depending upon, inter alia, the desired maximum fuel quantity injected during an injection cycle, the desired peak fuel injection pressure during an injection cycle, the desired fuel injection pressure decay or drop during an injection cycle, the bulk modulus of the fuel, and the displacement of the member 74 (i.e., stroke and effective area). The control passage 92 generally refers to either a relatively-low pressure fuel supply passage 96 or a relatively-low pressure fuel drain passage 98 defined in the injector 14.

The electrical actuation means 70 is provided for controlling the positions of the first and second valves 72,80. The electrical actuation means 70 is selectively de-energized or energized. For example, the electrical actuation means 70 may include a single solenoid or a plurality of solenoids. Alternatively, the means 70 may include a piezoelectric device. The first valve 72 is preferably positioned in the storage chamber 94 and selectively movable between a first position, at which the electrical actuation means 70 is de-energized, and a second position at which the electrical actuation means 70 is either energized or de-energized as explained below. At its first position, the first valve 72 opens fluid communication between the storage chamber 94 and the control passage 96. The first valve 72 is energized to move from its first (opened) position to its second (closed) position. At its closed position, the first valve 72 blocks fluid communication between the storage chamber 94 and the control passage 96. Preferably, one end portion of the first valve 72 includes an enlarged head positioned in the storage chamber 94. Another portion of the first valve 72 includes a land positioned in the bore 134 of the housing 132. Preferably, the outer periphery of the land includes one or more axially-extending flats or passages. The flats are arranged for communicating fuel, from the control passage 96 to the electrical actuation means 70, for cooling and equalizing fluid pressures.

The nozzle portion 68 defines a bore 100, an injection chamber 102 integral with or arranged in fluid communication with the storage chamber 94, a pressure control chamber 104 separate from the injection chamber 102 and storage chamber 94, a tip seat 106, and at least one fuel injection orifice 108.

In the embodiment shown, the intensification and pressurization member 74 preferably includes an intensifier piston 109 and a reciprocal plunger 110. The plunger 110 is preferably positioned in the storage chamber 94 and is selectively movable between a first position and a second position. When the first valve 72 is opened (i.e., its first position), the plunger 110 is operable during movement from its first to second positions for displacing a first variably-selected volume of fuel from the storage chamber 94 to the control passage 96. When the first valve 72 is closed (i.e., its second position) the plunger 110 is operable during movement from its first to second positions for displacing a second variably-selected volume of fuel in the storage chamber 94 thereby pressurizing such fuel to a selected variable pressure. Stated differently, after the first valve 72 is closed, the plunger 110 compresses the fuel to a controlled volume which is less than the fixed volume. To maximize the injection pressure available at the start of injection, the actuator 84 is electrically energized preferably so that movement of the plunger 110 from its first to second positions begins before initial fuel injection begins in an injection cycle. This also provides a variably selected injection pressure at the beginning of injection. In order to increase the mean effective injection pressure produced by the injector 14, the hydraulically-actuated plunger 110 continues moving from its first to second positions during initial fuel injection in an injection cycle. Alternatively, the actuator 84 can be electrically energized even earlier so that movement of the plunger 110 from its first position to its second position is completed prior to initial fuel injection during an injection cycle.

The check 76 is preferably positioned in the bore of the nozzle portion and selectively movable between a first position blocking fluid communication between the injection chamber 102 and the fuel injection orifice 108 and a second position opening fluid communication between the injection chamber 102 and the fuel injection orifice 108. The check 76 has a first end portion 112 and a second end portion 114. The first end portion 112 defines a first effective area arranged in partial fluid communication with the injection chamber 102 when the check 76 is closed (i.e., its first position). The first effective area is arranged to be in complete fluid communication with the injection chamber 102 when the check 76 is opened (i.e., its second position). The second end portion 114 defines a second effective area arranged in fluid communication with the pressure control chamber 104. The first biasing device 78 preferably includes a first mechanical spring 116 operable for biasing the check 76 towards its closed or first position. The check 76 is illustrated as an inwardly-opening valve. Alternatively, the check may be an outwardly-opening valve defining at least one injection orifice when it unseats from the tip seat.

The second valve 80 is selectively movable between a de-energized first position and an energized second position. Preferably, the second valve 80 is a three-way valve such as a popper valve or spool valve. The second valve 80 at its first position blocks fluid communication between the pressure control chamber 104 and the control passage 98 and opens fluid communication between the pressure control chamber 104 and the injection chamber 102. The second valve 80 at its second position opens fluid communication between the pressure control chamber 104 and the fuel control passage 98 and blocks fluid communication between the pressure control chamber 104 and the injection chamber 102. When the check 76 is closed and the second valve 80 is at its second position, the first and second effective areas are operable for hydraulically moving the check 76 towards its second (opened) position. When the check 76 is at its second (opened) position and the second valve 80 is at its first position, the first and second effective areas are operable for balancing opposing hydraulic forces acting on such effective areas thereby allowing the first biasing device 78 to move the check 76 towards its first (closed) position.

The second biasing device 82 preferably includes a second mechanical spring 118 for biasing both the first and second valves 72,80 towards their respective first positions. Alternatively, the second biasing device 82 may be a plurality of springs biasing the respective first and second valves towards their respective first positions.

In the embodiment shown, the injector 14 also includes, inter alia, a barrel 126 defining a bore 128 in which the plunger 110 reciprocates according to a predetermined tight clearance, a housing 132 connected to or integral with the barrel 126 and defining a bore 134 in which the first valve 72 reciprocates according to a relatively loose clearance, an optional sleeve (not shown) or hardened tubular insert sealedly positioned between the barrel 126 and the housing 132 and at least partially defining the fuel storage chamber 94, an electrical connector (not shown) electrically connected to the electrical actuation device 70, an upper seal 140, an upper stop 142 defining a bore 144 in which the second valve 80 reciprocates according to a predetermined tight clearance, a spacer 146, a lower stop 148, a popper sleeve 150 positioned between the spacer 146 and the lower stop 148, a body 152 defining the bore 100 in which the check 76 reciprocates according to a preselected tight clearance, a tip 154 which defines the tip seat 106 and the injection orifice(s) 108, and a case 156 connected to the housing 132.

The housing 132 and first valve 72 each define a seat 158,160 which sealedly contact one another when the first valve 72 is closed.

The upper stop 142 and second valve 80 each define a seat 162,164 which sealedly contact one another when the second valve 80 is at its second position. The popper sleeve 150 and second valve 80 each define a separate seat 168,170 which sealedly contact one another when the second valve 80 is at its first position.

Preferably, the popper sleeve 150 defines a bore 172 in which the second valve 88 reciprocates according to a predetermined tight clearance. Preferably, the popper sleeve 150 is loosely positioned, in the axial and radial directions, between the spacer 146 and the lower stop 148. As shown in FIGS. 5–7, the popper sleeve 150 also defines one or more separate control orifices which generally radially communicate between the bore 172 and the outer periphery of the popper sleeve 150 and thence to the fuel drain passage 98.

Preferably, the electrical actuation device 70 is connected to the housing 132. The upper stop 142, spacer 146, lower stop 148, body 152, and tip 154 are retained between the case 156 and the housing 132.

In the embodiment shown, the actuator and valve assembly 64 is positioned colinear with the axis 62. Alternatively, the actuator and valve assembly 64 may be positioned at an angle (for example 90°) relative to the axis 62 or even separate from the injector 14.

The hydraulic energy recirculating or recovering means 22 preferably includes a waste actuating fluid control valve 174 for each injector 14, a common recirculation line 176 connected to each valve 174, and a hydraulic motor 178 connected between the actuating fluid pump 34 and the recirculation line 176. Preferably, each control valve 174 is a solenoid control valve selectively activated by the ECM 56. The control valve 174 opens after injection of the respective injector 14 is completed and closes after the fluid pressure is communicated to the recirculation line 176 and hydraulic motor 178. Preferably, the hydraulic motor 178 has a rotatable output shaft which is adapted to rotatably drive the drivetrain of the engine 12.

Industrial Applicability

In operation, before an injection cycle begins, the electrical actuation device 70 or solenoid is normally de-energized so that the first valve 72 is opened and the second valve 80 is at its first position. The check 76 is at its first (closed) position. The opened first valve 72 allows the fuel storage chamber 94 and the injection chamber 102 to be filled with relatively low pressure fuel provided by the pressure control passage 96.

The plunger 110 is hydraulically driven downwardly by pressurized hydraulically-actuating fluid selectively provided to the intensifier piston 109 after electrical actuation of the actuator 84. The plunger 110 begins its stroke from its retracted or first position. At a selected amount of plunger stroke, the solenoid 70 is energized causing closure of the first valve 72, movement of the second valve 80 to its second position, and compression of the second spring 118. The solenoid 70 preferably remains energized until the fuel pressure in the storage chamber 94 reaches a level sufficient to hydraulically hold the first valve 72 closed. The solenoid 70 is then de-energized allowing the compressed second spring 118 to return the second valve 80 to its first position. The fuel pressure in the storage chamber 94 and the injection chamber 102 continues to increase to a variably selected pressure due to continued stroking of the plunger 110. With the second valve 80 at its first position, high pressure fuel communicates with the pressure control chamber 104 from the injection chamber 102 between opened seats 162,164.

With the check 76 seated, the second effective area exposed to high fuel pressure is greater than the first effective area exposed to high fuel pressure thereby preventing the check 76 from opening.

To start injection, the solenoid 70 is again energized thereby moving the second valve 80 to its second position and again compressing the second spring 118. This closes seats 164,162 of the second valve and upper stop. This also opens seats 170,168 of the second valve 80 and the popper sleeve 150 communicating the pressure control chamber 104 with the control pressure passage 98. By reducing the pressure in the pressure control chamber 104 and having high pressure in the injection chamber 102, the check 76 opens to begin fuel injection through the injection orifice(s) 108 and into the engine combustion chamber (not shown).

To end fuel injection, the solenoid 70 is again de-energized, allowing the compressed second spring 118 to return the second valve 80 back to its first position and closing seats 170,168 of the second valve 80 and the popper sleeve 150 to block fluid communication between the pressure control chamber 104 and the control pressure passage 98. Moreover, seats 164,162 of the second valve 88 and the upper stop 142 are opened communicating the pressure control chamber 104 with the injection chamber 102 thereby introducing high pressure fuel back into the pressure control chamber 104.

Preferably, the first and second effective areas of the check 76 are sized such that when the check 76 is opened and the second valve 80 is at its first position, the net hydraulic forces acting on the check 76 are effectively zero. In other words, the net opposing fluid pressures are equal and also the first and second effective areas on which such pressures act are equal. When the check 76 is opened, the force of the first spring 116 is preferably the only unbalanced force acting on the check 76, consequently biasing the check 76 toward its first (closed) position. At the end of a fuel injection cycle or injection segment, the force of the first spring 116 urges the check 76 from its opened position to its closed position at a selected velocity. The first spring force is preferably chosen to be sufficiently high for adequate check response yet sufficiently low to gently move the check 76 toward the tip seat 106 so that the check 76 does not overstress the tip 154 upon initial contact. Advantageously, the end of fuel injection during an injection cycle or segment is more precisely controlled since the velocity of the check 76 in the closing direction is primarily determined only by the force of the first spring 116 with minimal affect by the fuel injection pressure.

The following are advantages of the subject invention. The subject invention produces a higher mean injection pressure compared to the mean injection pressure of conventional injectors for approximately the same peak injection pressure and total fuel quantity. Moreover, a higher initial injection pressure is available with the subject invention at the beginning of fuel injection. Moreover, the subject invention produces a sharper or more abrupt end of injection compared to the end of injection of conventional injectors. The subject invention is capable of varying peak fuel injection pressure independent of engine speed and load. The subject invention is capable of variably controlling the fuel quantity of each separate fuel injection segment during an injection cycle. The subject invention is also capable of variably controlling each time interval between each separate fuel injection segment during an injection cycle. Moreover, the solenoid 78 can be energized and de-energized once or a selected plurality of times during an injection cycle to produce one or a variably-selected plurality of injection segments.

Moreover, the hydraulic energy recovering and reusing means 22 improves efficiency of operation of the HEUI-II fuel system 10. Rather than dumping used actuating fluid to the sump 24 following injection, the energy stored in such used pressurized actuating fluid is returned to the source 32 by directing it through the hydraulic motor 178. The hydraulic motor 178 converts hydraulic flow and pressure of the actuating fluid received from the injectors 14 into mechanical energy which rotatably drives the drivetrain of the engine 12. This arrangement provides improved brake specific fuel consumption (BSFC) or efficiency of the engine 12.

Other aspects, objects, and advantages of this invention can be obtained from a study of the drawings, the disclosure, and the appended claims.

We claim:

1. A hydraulically-actuated electronically-controlled unit fluid injector comprising:

a housing portion defining a fluid control passage and a fluid storage chamber;

a first pressure control valve operable to selectively open and close fluid communication between the storage chamber and the control passage;

a nozzle portion defining a pressure control chamber and at least one fluid injection orifice;

a hydraulically-actuated fluid pressurization member selectively movable between a first position and a second position, when the first valve is opened said member operable during movement from its first to second positions for displacing fluid from the storage chamber to the control passage, when the first valve is closed said member operable during movement from its first to second positions for displacing fluid in the storage chamber thereby pressurizing such fluid to a selected pressure;

a movable direct-operated check operable to selectively close and open fluid communication between the storage chamber and the fluid injection orifice, said check having a first end portion and a second end portion, said first end portion defining a first effective area arranged in partial fluid communication with the storage chamber when the check is closed, said first effective area arranged in complete fluid communication with the storage chamber when the check is opened, said second end portion defining a second effective area arranged in fluid communication with the pressure control chamber; and a second pressure control valve selectively movable between a first position and a second position, said second valve at its first position closing fluid communication between the pressure control chamber and the control passage and opening fluid communication between the pressure control chamber and the storage chamber, said second valve at its second position opening fluid communication between the pressure control chamber and the control passage and closing fluid communication between the pressure control chamber and the storage chamber, when the check is closed and the second valve is at its second position said first and second effective areas are operable for hydraulically opening the check, when the check is opened and the second valve is at its first position said first and second effective areas are operable for balancing opposing hydraulic forces acting on such effective areas.

2. An hydraulically-actuated electronically-controlled unit fluid injector comprising:

a housing portion defining a fluid control passage and a fluid storage chamber;

a first pressure control valve selectively movable between a first position opening fluid communication between the storage chamber and the control passage and a second position blocking fluid communication between the storage chamber and the control passage;

a nozzle portion defining a pressure control chamber and at least one fluid injection orifice;

a hydraulically-actuated fluid pressurization member selectively movable between a first position and a second position, when the first valve is at its first position said member operable during movement from its first to second positions for displacing fluid from the storage chamber to the control passage, when the first valve is at its second position said member operable during movement from its first to second positions for displacing fluid in the storage chamber thereby pressurizing such fluid to a selected pressure;

a direct-operated check selectively movable between a first position blocking fluid communication between the storage chamber and the fluid injection orifice and a second position opening fluid communication between the storage chamber and the fluid injection orifice, said check having a first end portion and a second end portion, said first end portion defining a first effective area arranged in fluid communication with the storage chamber when the check is at its second position, said second end portion defining a second effective area arranged in fluid communication with the pressure control chamber; and a second pressure control valve selectively movable between a first position and a second position, said second valve at its first position blocking fluid communication between the pressure control chamber and the control passage and opening fluid communication between the pressure control chamber and the storage chamber, said second valve at its second position opening fluid communication between the pressure control chamber and the control passage and blocking fluid communication between the pressure control chamber and the storage chamber, when the check is at its first position and the second valve is at its second position said first and second effective areas are operable for hydraulically moving the check towards its second position, when the check is at its second position and the second valve is at its first position said first and second effective areas are operable for balancing opposing hydraulic forces acting on such effective areas.

3. The unit fluid injector of claim 2 further comprising a first biasing device operable to bias the check towards its first position.

4. The unit fluid injector of claim 2 further comprising a second biasing device operable to bias both the first and second pressure control valves towards their respective first positions.

5. The unit fluid injector of claim 4 further comprising a solenoid including a single stationary pole piece and opposed first and second movable armatures, said first armature connected to the first valve and operable to move the first valve to its second position, said second armature connected to the second valve and operable to move the second valve to its second position.

6. The unit fluid injector of claim 5 wherein said second biasing device is a spring positioned between the first and second armatures.

7. The unit fluid injector of claim 2 wherein said control passage is a fluid supply passage.

8. The unit fluid injector of claim 2 wherein said control passage is a fluid drain passage.

9. The unit fluid injector of claim 2 wherein said first and second effective areas are equal when the check is at its second position.

10. The unit fluid injector of claim 2 wherein said first valve is a two-way popper-valve.

11. The unit fluid injector of claim 2 wherein said second valve is a three-way popper-valve.

12. A hydraulically-actuated electronically-controlled unit fuel injector comprising:

a housing portion defining a fuel control passage and an integral fixed-volume fuel storage chamber;

an electronically-controlled first pressure control valve positioned in the storage chamber, said first valve selectively movable between a de-energizeable first position opening fluid communication between the storage chamber and the control passage and an energizeable second position blocking fluid communication between the storage chamber and the control passage;

a nozzle portion defining a bore, an injection chamber arranged in continuous fluid communication with the storage chamber, a separate pressure control chamber separate from the injection chamber, a tip seat, and at least one fuel injection orifice;

a hydraulically-actuated fuel pressurization plunger positioned in the storage chamber, said plunger selectively reciprocally movable between a first position and a second position, when the first valve is at its first position said plunger operable during movement from its first to second positions for displacing fuel from the storage chamber to the control passage, when the first valve is at its second position said plunger operable during movement from its first to second positions for displacing fuel in the storage chamber thereby pressurizing such fuel to a selected variable pressure;

a direct-operated check positioned in the bore of the nozzle portion and selectively movable between a first position blocking fluid communication between the storage chamber and the fuel injection orifice and a second position opening fluid communication between the storage chamber and the fuel injection orifice, said check having a first end portion and a second end portion, said first end portion defining a first effective area arranged in partial fluid communication with the injection chamber when the check is at its first position, said first effective area arranged in complete fluid communication with the injection chamber when the check is at its second position, said second end portion defining a second effective area arranged in fluid communication with the pressure control chamber;

a first spring operable for biasing the check towards its first position;

an electronically-controlled second pressure control valve selectively movable between a de-energizeable first position and an energizeable second position, said second valve at its first position blocking fluid communication between the pressure control chamber and the control passage and opening fluid communication between the pressure control chamber and the injection chamber, said second valve at its second position opening fluid communication between the pressure control chamber and the control passage and blocking fluid communication between the pressure control chamber and the injection chamber, when the check is at its first position and the second valve is at its second position said first and second effective areas are operable for hydraulically moving the check towards its second position, when the check is at its second position and the second valve is at its first position said first and second effective areas are operable for balancing opposing hydraulic forces acting on such effective areas thereby allowing the first spring to move the check towards its first position; and a second spring operable for biasing both the first and second pressure control valves towards their respective first positions.

13. A hydraulically-actuated electronically-controlled fuel injection system adapted for an engine comprising:

a source of pressurized hydraulically-actuating fluid;

a housing defining a fuel control passage and a fuel storage chamber;

a first pressure control valve operable to selectively open and close fluid communication between the storage chamber and the control passage;

a hydraulically-actuated fuel pressurization member selectively movable between a first position and a second position, when the first valve is opened said member operable during movement from its first to second positions for displacing fuel from the storage chamber to the control passage, when the first valve is closed said member operable during movement from its first to second positions for displacing fuel in the storage chamber thereby pressurizing such fuel to a selected pressure;

an actuator and valve assembly operable for selectively communicating pressurized hydraulically-actuating fluid to the fuel pressurization member and thereby selectively actuate the member for movement between its first and second positions;

an electronically-controlled injector including a nozzle portion and a movable direct-operated check, said nozzle portion defining a pressure control chamber and at least one fuel injection orifice, said check operable to selectively close and open fluid communication between the storage chamber and the fuel injection orifice, said check having a first end portion and a second end portion, said first end portion defining a first effective area arranged in partial fluid communication with the storage chamber when the check is closed, said first effective area arranged in complete fluid communication with the storage chamber when the check is opened, said second end portion defining a second effective area arranged in fluid communication with the pressure control chamber; and a second pressure control valve selectively movable between a first position and a second position, said second valve at its first position closing fluid communication between the pressure control chamber and the control passage and opening fluid communication between the pressure control chamber and the storage chamber, said second valve at its second position opening fluid communication between the pressure control chamber and the control passage and closing fluid communication between the pressure control chamber and the storage chamber, when the check is closed and the second valve is at its second position said first and second effective areas are operable for hydraulically opening the check, when the check is opened and the second valve is at its first position said first and second effective areas are operable for balancing opposing hydraulic forces acting on such effective areas.

14. The fuel injection system of claim 13 further including means for recovering energy from the hydraulically-actuating fluid communicated to the fuel pressurization member.

15. The fuel injection system of claim 14 wherein said energy recovering means includes a drain passage connected to the source of pressurized hydraulically-acting fluid and selectively in fluid communication with the fuel pressurization member.

16. The fuel injection system of claim 15 wherein said recirculation passage further includes a hydraulic motor positioned between said recirculation line and the source.

17. The fuel injection system of claim 16 further including a control valve positioned in the recirculation line upstream of said hydraulic motor.

18. The fuel injection system of claim 13 further including a programmable electronic control module operable to electronically control the first and second valves independent of engine speed and loading.

19. A method of operating a hydraulically-actuated electronically-controlled unit fuel injector comprising the steps of:

opening fluid communication between a fixed-volume fuel storage chamber and a control passage;

closing fluid communication between the storage chamber and at least one fuel injection orifice;

displacing, via a hydraulically-actuated fuel pressurization member, a variably-selected volume of fuel from the storage chamber to the control passage;

closing fluid communication between the storage chamber and the control passage;

displacing, via said member, another variably-selected volume of fuel in the storage chamber and thereby pressurizing the fuel to a selected pressure;

opening fluid communication between the storage chamber and the fuel injection orifice to begin fuel injection; and closing fluid communication between the storage chamber and the fuel injection orifice to end fuel injection.

20. A method of operating a hydraulically-actuated electronically-controlled unit fuel injector comprising the steps of:

opening fluid communication between a fixed-volume fuel storage chamber and a control passage;

closing a check to block fluid communication between the storage chamber and at least one fuel injection orifice;

displacing, via a hydraulically-actuated fuel pressurization member, a variably-selected volume of fuel from the storage chamber to the control passage;

closing fluid communication between the storage chamber and the control passage;

displacing, via said member, another variably-selected volume of fuel in the storage chamber and thereby pressurizing the fuel to a selected pressure;

biasing the check towards a closed position blocking fluid communication between the storage chamber and the fuel injection orifice;

hydraulically-unbalancing the check for movement towards an opened position opening fluid communication between the storage chamber and the fuel injection orifice; and hydraulically-balancing the check and allowing the biased check to move to the closed position.

\* \* \* \* \*